United States Patent
Uchiyama et al.

(10) Patent No.: US 8,807,117 B2
(45) Date of Patent: *Aug. 19, 2014

(54) MOTOR-DRIVEN THROTTLE VALVE DEVICE WITH INDUCTIVE THROTTLE SENSOR AND INDUCTIVE THROTTLE SENSOR FOR DETECTING ROTATION ANGLE OF THROTTLE SHAFT OF MOTOR-DRIVEN THROTTLE VALVE DEVICE

(71) Applicant: Hitachi Automotive Systems, Ltd., Hitachinaka (JP)

(72) Inventors: Yasuhisa Uchiyama, Hitachinaka (JP); Morio Kuwano, Kasama (JP); Kenji Usui, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,572

(22) Filed: Apr. 15, 2013

(65) Prior Publication Data

US 2013/0233277 A1    Sep. 12, 2013

Related U.S. Application Data

(63) Continuation of application No. 13/723,536, filed on Dec. 21, 2012, now Pat. No. 8,474,434, which is a continuation of application No. 12/766,335, filed on Apr. 23, 2010, now Pat. No. 8,375,921.

(30) Foreign Application Priority Data

Jun. 18, 2009   (JP) .................................. 2009-144861

(51) Int. Cl.
*F02D 9/10*   (2006.01)

(52) U.S. Cl.
USPC ............................ 123/337; 123/361; 123/399

(58) Field of Classification Search
USPC .................. 123/337, 361, 399, 403, 583–586
See application file for complete search history.

(56) References Cited

U.S. PATENT DOCUMENTS 5,983,858 A    11/1999  Hashimoto et al.
6,279,535 B1    8/2001  Matsusaka
(Continued)

FOREIGN PATENT DOCUMENTS

EP    1538321 A    6/2005
EP    1914520 A2   4/2008
(Continued)

*Primary Examiner* — John Kwon
*Assistant Examiner* — Johnny H Hoang
(74) *Attorney, Agent, or Firm* — Crowell & Moring LLP

(57) ABSTRACT

In a situation where a conventional inductive throttle sensor is used with a motor-driven throttle valve device to detect the rotation angle of a throttle shaft, plural sensor connection conductor sections for connecting a connector terminal to a circuit board terminal section are formed on the cover on one lateral surface side of a circuit board in the long-axis direction. This increases the dimension of the cover in the short-axis direction (the dimension in the direction of air flow in an intake path). Consequently, it is difficult to install the motor-driven throttle valve device and inductive throttle sensor in a narrow engine room. This problem is addressed by using a separate member to achieve electrical conduction between a stator circuit board and a conductor routed inside the cover installed over the stator circuit board in a concentrated manner on one side of the circuit board. The problem is also addressed by disposing plural electrical conduction spots in a decentralized manner and away from a protrusion provided to limit the amount of axial movement of a gear.

3 Claims, 8 Drawing Sheets

(56) References Cited

U.S. PATENT DOCUMENTS

| | | |
|---|---|---|
| 6,684,840 B1 | 2/2004 | Kuwano et al. |
| 6,691,681 B2 | 2/2004 | Wayama et al. |
| 6,739,312 B2 | 5/2004 | Komeda et al. |
| 6,776,137 B2 | 8/2004 | Kawai et al. |
| 7,036,486 B2 | 5/2006 | Kamimura et al. |
| 2002/0171059 A1 | 11/2002 | Sakurai et al. |
| 2003/0066515 A1 | 4/2003 | Saito et al. |
| 2004/0103879 A1* | 6/2004 | Kino et al. .................... 123/337 |
| 2005/0236219 A1 | 10/2005 | Saito et al. |
| 2006/0237552 A1 | 10/2006 | Umemura et al. |
| 2006/0272615 A1* | 12/2006 | Wayama et al. ............... 123/399 |
| 2007/0000455 A1* | 1/2007 | Akiyama et al. ................ 123/19 |
| 2007/0107708 A1 | 5/2007 | Uchiyama et al. |
| 2007/0200560 A1 | 8/2007 | Saito et al. |
| 2008/0087858 A1 | 4/2008 | Hatsuzawa et al. |
| 2008/0110435 A1 | 5/2008 | Baasch et al. |
| 2009/0283069 A1 | 11/2009 | Hellinger et al. |

FOREIGN PATENT DOCUMENTS

| | | |
|---|---|---|
| JP | 09-032588 | 2/1997 |
| JP | 2003-254782 A | 9/2003 |
| JP | 2004-332635 | 11/2004 |
| JP | 2006-097627 | 4/2006 |
| JP | 2008-096231 | 4/2008 |
| JP | 2008-175064 | 7/2008 |
| WO | WO 2008034656 A1 | 3/2008 |

* cited by examiner

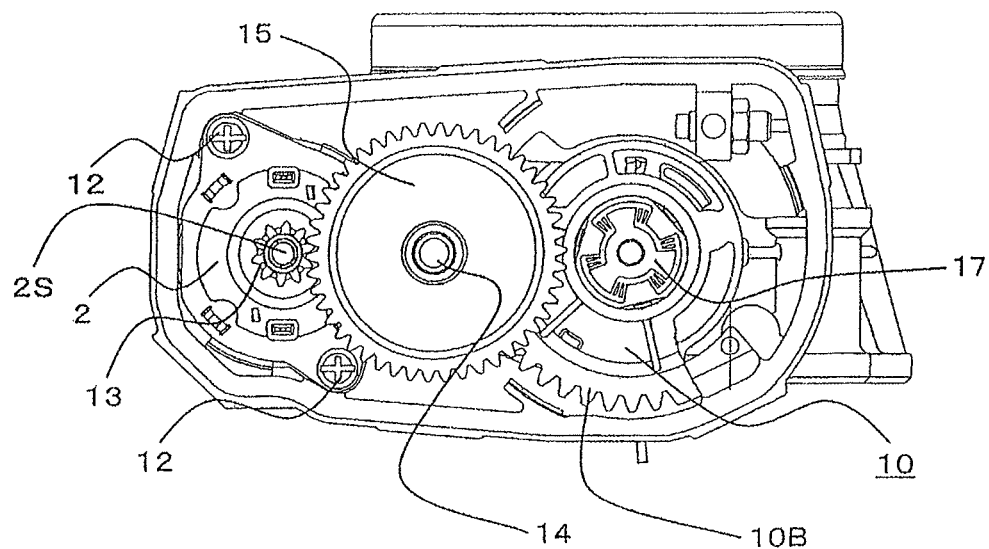

MOTOR-DRIVEN THROTTLE VALVE DEVICE WITH INDUCTIVE THROTTLE SENSOR AND INDUCTIVE THROTTLE SENSOR FOR DETECTING ROTATION ANGLE OF THROTTLE SHAFT OF MOTOR-DRIVEN THROTTLE VALVE DEVICE

CROSS REFERENCE TO RELATED APPLICATIONS

This application is a continuation of U.S. patent application Ser. No. 13/723,536, filed Dec. 21, 2012, the entire disclosure of which is incorporated herein by reference, the priority of which is claimed, which is a continuation of U.S. patent application Ser. No. 12/766,335, filed Apr. 23, 2010, now U.S. Pat. No. 8,375,921, issued Feb. 19, 2013, the priority of which is claimed, which claims priority under 35 U.S.C. §119 to Japanese Patent Application No. 2009-144861, filed Jun. 18, 2009, the priority of which is also claimed here.

BACKGROUND OF THE INVENTION

1. Field of the Invention

The present invention relates to an inductive throttle sensor that detects the rotation angle of a throttle shaft of a motor-driven throttle valve device by making use of the fact that the inductance between an excitation conductor mounted on the throttle shaft and a receiver coil mounted on a cover facing the excitation conductor varies with the rotational position of the throttle shaft. The invention also relates to a motor-driven throttle valve device having such a sensor.

2. Description of the Related Art

A device disclosed in JP-2003-254782-A is known as a so-called inductive throttle sensor that detects the position or rotation angle of a rotating body in accordance with an inductance change.

Further, using this type of throttle sensor as a throttle sensor for a throttle shaft of a motor-driven throttle valve device is disclosed in JP-2008-96231-A.

SUMMARY OF THE INVENTION

Conventional motor-driven throttle valve devices with an inductive throttle sensor and conventional inductive throttle sensors for detecting the rotation angle of a throttle shaft of a motor-driven throttle valve device are configured so that a circuit board mounted on a cover (so-called gear cover) carries an exciting coil conductor and a detection circuit. However, a connector to be connected to an external wiring plug is mounted on a lateral surface in the long-axis direction of the circuit board. Therefore, plural sensor connection conductor sections for connecting a connector terminal to a circuit board terminal section are formed on the cover on one lateral surface side of the circuit board in the long-axis direction. This increases the dimension of the cover in the short-axis direction (the dimension in the direction of air flow in an intake path). Consequently, it is difficult to install the conventional motor-driven throttle valve devices and inductive throttle sensors in a narrow engine room.

An object of the present invention is to reduce the dimension in the short-axis direction of the cover (so-called gear cover) (the dimension in the direction of air flow in the intake path).

To achieve the above object, the present invention is configured so that a sensor connection conductor section for connecting a sensor circuit to a sensor connector terminal extends toward a motor terminal connection, joins with a motor connection conductor section for connecting the motor terminal connection to a motor connector terminal, and is wired to a connector. As a result, the sensor circuit is installed between an excitation conductor and a retainer that prevents the axial separation of an intermediate gear.

Using a circuit board mounting method according to the present invention makes it possible to provide a motor-driven throttle valve having a small-size, lightweight, noncontact throttle sensor without sacrificing performance characteristics such as the accuracy of a rotational angle detector and the strength and responsiveness required of a throttle valve device.

BRIEF DESCRIPTION OF THE DRAWINGS

FIG. 2 is an exploded front view of the motor-driven throttle valve device.

FIG. 3 is a partial cross-sectional view of a rotating conductor of an inductive rotational angle detector.

DESCRIPTION OF THE PREFERRED EMBODIMENTS

Figure 1:
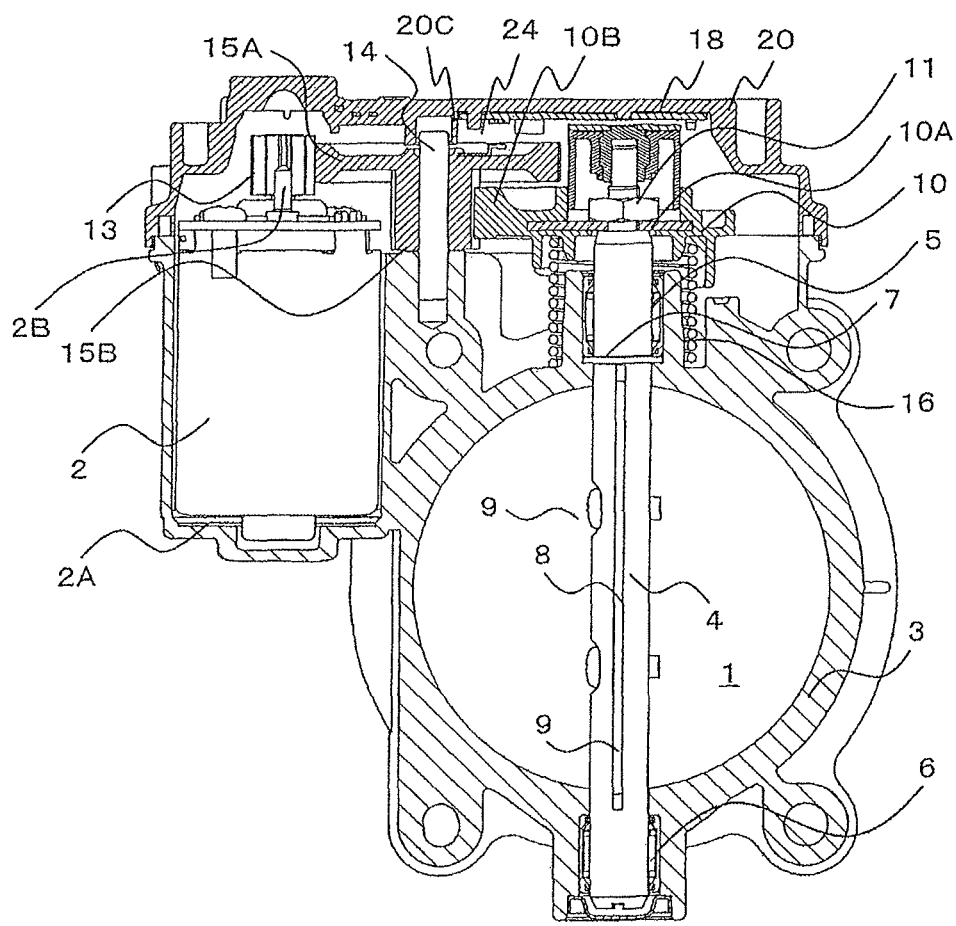
FIG. 1 is an overall cross-sectional view of a motor-driven throttle valve device.

A motor-driven throttle valve device with an inductive throttle sensor according to an embodiment of the present invention basically is configured as described below.

A throttle body 3 has a bore 1, which serves as an intake path for supplying air taken in by an air cleaner to each cylinder of an internal combustion engine.

A throttle shaft 4 extends through the bore 1 in a direction intersecting the flow of air. A butterfly throttle valve 8 is fastened to the throttle shaft 4 to open and close the bore 1. A motor 2 drives the throttle shaft 4. A train of reduction gears (10, 13, and 15) transmits the rotation of the motor 2 to the throttle shaft 4 and includes an output gear 13, a throttle gear 10, and an intermediate gear 15. The output gear 13 is fastened to a rotor shaft 2S of the motor 2. The throttle gear 10 is fastened to the leading end of the throttle shaft 4 and used as a final stage gear. The intermediate gear 15 is positioned between the output gear 13 and the throttle gear 10.

A rotation angle sensor (throttle sensor) for detecting the rotation angle of the throttle valve is configured as described below.

An excitation conductor 17A is mounted on the throttle shaft 4. A gear cover 20 is mounted on the throttle body 3 to cover the reduction gears (10, 13, and 15). A TPS circuit board 18 is mounted on the gear cover 20. A receiver coil 18A2 and an exciting coil 18A1 are mounted on the TPS circuit board 18.

A sensor circuit 18B is mounted on the TPS circuit board 18 to detect a change in the inductance between the excitation conductor 17A and the receiver coil 18A2 and determine the rotation angle of the throttle shaft 4. In the present embodiment of the present invention, the sensor circuit 18B includes two microcomputers and peripheral circuit elements.

Retainers 15C, 20C, and 20D are positioned between the gear-side surface of the gear cover 20 and an end of the intermediate gear 15 to prevent the axial separation of the intermediate gear 15.

Motor terminal connections 20F and 20G are mounted on the gear-side surface of the gear cover 20 and electrically connected to a motor terminal 2B projecting from the motor 2.

Plural connector terminals 201 to 206, which are mounted on the gear cover 20 and provided for a connector 20B to which external wiring plugs are connected. The plural connector terminals 201 to 206 include motor connector terminals 205 and 206, which are connected to the motor terminal connections 20F and 20G, and sensor connector terminals 201 to 204, which are connected to the sensor circuit 18B.

A sensor connection conductor section 21, which connects the sensor circuit 18B to the sensor connector terminals 201 to 204, extends toward the motor terminal connections 20F and 20G, joins with (aligns in parallel with) motor connection conductor sections 21M1 and 22M2, which connect the motor terminal connections 20F and 20G to the motor connector terminals 205 and 206, and is wired to the connector 20B.

The sensor circuit 18B is positioned between the retainers 15C, 20C, and 20D, which prevent the axial separation of the intermediate gear 15, and the coils (exciting coil 18A1 and receiver coil 18A2).

More specifically, the retainers 15C, 20C, and 20D, which prevent the axial separation of the intermediate gear 15, are positioned between the motor terminal connections 20F and 20G and a connection for connecting the sensor circuit 18B to the sensor connection conductor section 21. The sensor connection conductor section 21 for connecting the sensor circuit 18B to the sensor connector terminals 201 to 204 passes by the retainers 15C, 20C, and 20D and extends toward the motor terminal connections 20F and 20G.

The gear cover 20 is preferably made of plastic molding. The retainers 20C and 20D preferably include a protrusion that is formed integrally on the plastic molding of the gear cover 20 and projected toward the intermediate gear.

In another embodiment, the gear cover 20 may be made of plastic molding while the retainers 20C and 20D include a protrusion that is formed by the surface of the plastic molding of the gear cover 20 covering the sensor connection conductor section 21 and the retainer 15C protrudes from the intermediate gear 15.

Preferably, the connection between the sensor circuit 18B and the sensor connection conductor section 21 is disposed in a decentralized manner on both sides of the retainers, which prevent the axial separation of the intermediate gear 15. Decentralized wiring variations are shown in FIGS. 6 and 14 to 17.

Figure 11:
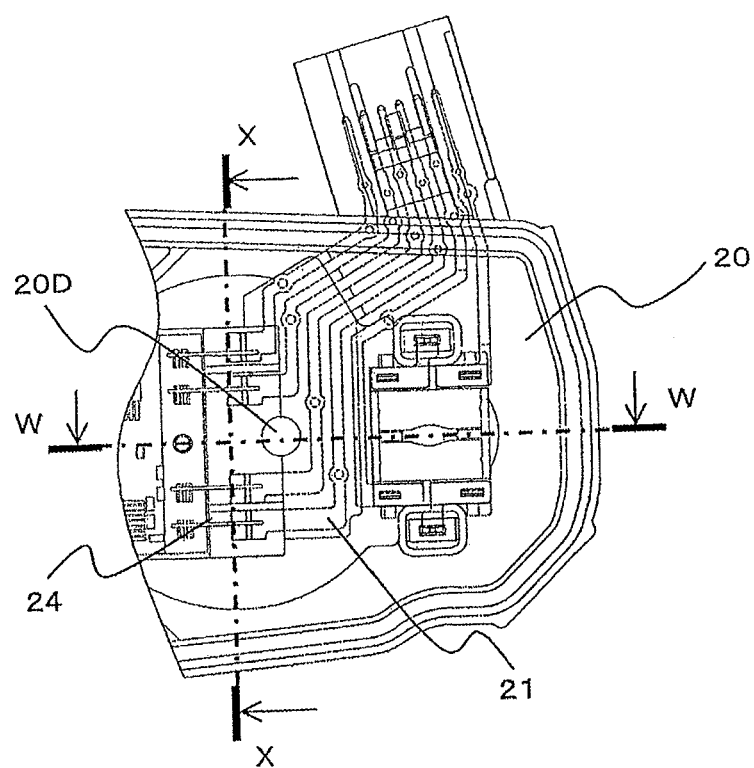
FIG. 11 is an inside view of the gear cover according to a third embodiment of the present invention.

In another embodiment, the sensor connection conductor section 21 may be wired in a decentralized manner on both sides of the retainers 15C, 20C, and 20D, which prevent the axial separation of the intermediate gear 15 (FIG. 11).

Central axis lines of the throttle shaft 4, the rotor shaft 2S of the motor 2, and a shaft 14 for supporting the rotation of the intermediate gear 15 are preferably arranged in the same plane. This provides an improved space factor in the direction of intake air flow.

The sensor circuit 18B is preferably positioned to face the intermediate gear 15. This provides an improved space factor in the direction of the throttle shaft 4.

Preferably, the connector terminals are horizontally aligned in a plane parallel to a gear cover mounting surface while the two motor connector terminals 205 and 206 are positioned together at a far end from the throttle shaft 4. This decreases the connector thickness, provides the sensor connector terminals with high noise immunity, and makes it easy to identify the terminals during testing.

An inductive throttle sensor according to an embodiment of the present invention detects the rotation angle of a throttle shaft of a motor-driven throttle valve device.

The motor-driven throttle valve device includes a throttle body 3 having a bore 1, which serves as an intake path for supplying air taken in by an air cleaner (not shown) to each cylinder of an internal combustion engine.

The motor-driven throttle valve device also includes a throttle shaft 4, which extends in the intake path in a direction intersecting the flow of air; a butterfly throttle valve 8, which is fastened to the throttle shaft 4 to open and close the intake path; a motor 2, which drives the throttle shaft 4; and a train of reduction gears (10, 13, and 15) that transmits the rotation of the motor 2 to the throttle shaft 4 and includes an output gear 13, a throttle gear 10, and an intermediate gear 15. The output gear 13 is fastened to a rotor shaft 2S of the motor 2. The throttle gear 10 is fastened to the throttle shaft 4. The intermediate gear 15 is positioned between the output gear 13 and the throttle gear 10.

The inductive throttle sensor includes an excitation conductor 17A, which is mounted on the throttle shaft 4; a gear cover 20, which is mounted on the throttle body 3 to cover the reduction gears (10, 13, and 15); a receiver coil 18D and an exciting coil 18A, which are mounted on a circuit board mounted on the gear cover 20; a sensor circuit 18B that is mounted on a TPS circuit board 18 to detect a change in the inductance between the excitation conductor 17A and the receiver coil 18D and determine the rotation angle of the throttle shaft 4; retainers (15C, 20C, and 20D), which is positioned between a surface of the gear cover 20 that is positioned toward the reduction gears (10, 13, and 15) and an end face of the intermediate gear 15 to prevent the axial separation of the intermediate gear 15; motor terminal connections 20F and 20G, which are mounted on a surface of the gear cover 20 that is positioned toward the reduction gears (10, 13, and 15), and electrically connected to a motor terminal 2B projecting from the motor 2; a connector 20B, which is mounted on the gear cover 20 and connected to an external wiring plug; and a plurality of connector terminals 201 to 206 mounted on the connector 20B. The plural connector terminals 201 to 206 include motor connector terminals 205 and 206, which are connected to the motor terminal connections 20F and 20G, and sensor connector terminals 201 to 204, which are connected to the sensor circuit. A sensor connection conductor section 21 for connecting the sensor circuit 18B to the sensor connector terminals 201 to 204 extends toward the motor terminal connections 20F and 20G, joins with motor connection conductor sections 21M1 and 22M2 for connecting the motor terminal connections 20F and 20G to the motor connector terminals 205 and 206, and is wired to the connector 20B. The sensor circuit 18B is installed between the exciting coil 18A and the retainers 15C, 20C, and 20D, which prevent the axial separation of the intermediate gear 15.

The embodiments of the present invention will now be described in more detail with reference to the accompanying drawings.

First Embodiment

First of all, the configuration of a motor-driven throttle valve device according to a first embodiment of the present invention, which is used with an internal combustion engine, will be described with reference to FIGS. 1 and 2.

FIG. 1 is an overall cross-sectional view of the motor-driven throttle valve device. FIG. 2 is an exploded front view of the motor-driven throttle valve device.

The motor-driven throttle valve device has an aluminum die-casting throttle body 3. The throttle body 3 is cast together with a cylindrical intake path 1 (hereinafter referred to as the bore), which supplies air taken in by an air cleaner (not shown) to each cylinder (not shown), and a motor housing 2A, which has a cylindrical inner circumferential surface for housing the motor 2.

A metallic rotary shaft (hereinafter referred to as the throttle shaft) 4 is oriented along a linear diameter of the bore 1 in the throttle body 3 and extended through the bore 1. Both ends of the throttle shaft 4 are rotatably supported by needle bearings 5 and 6, which are mounted on the throttle body 3 as shaft supports. The needle bearings 5 and 6 are secured by press-fitting them into the throttle body 3.

The needle bearing 5 is press-fit into its position after a C-shaped washer (hereinafter referred to as the thrust retainer) is inserted into a circular slit in the throttle shaft 4. This limits the amount of axial movement of the throttle shaft 4.

Further, an axially extended slit is formed in the throttle shaft 4. A throttle valve 8 made of a metal disc is inserted into this slit and secured with screws 9.

Consequently, when the throttle shaft 4 rotates, the throttle valve 8 rotates. As a result, the effective area of the intake path changes to adjust an intake air amount of the internal combustion engine.

A throttle gear 10 is fastened to one end of the throttle shaft 4 with a nut 11. The throttle gear 10 includes a metal plate 10A and a gear section 10B. The gear section 10B is formed on the metal plate 10A by insert molding.

The motor housing 2A is formed in parallel with the throttle shaft 4. A brushed DC motor 2 is inserted into the motor housing 2A and secured with screws 12. A metal gear (hereinafter referred to as the motor gear) 13, which serves as an output gear having the fewest gear teeth, is fastened to an end of the rotary shaft of the motor 2.

A gear (hereinafter referred to as the intermediate gear) 15 is interposed in mesh between the motor gear 13 and the throttle gear 10. The intermediate gear 15 is rotatably supported by a metallic stationary shaft 14 (hereinafter referred to as the intermediate gear shaft), which is secured by press-fitting it into the throttle body 3. The intermediate gear 15 includes a large-diameter gear 15A, which meshes with the motor gear 13, and a small-diameter gear 15B, which meshes with the throttle gear 10. These gears 15A and 15B are formed integrally by plastic molding.

The above-mentioned gears 13, 15A, 15B, and 10 form a two-stage reduction gear mechanism so that the rotation of the motor 2 is transmitted to the throttle shaft 4 through the reduction gear mechanism.

A return spring 16, which is a coil spring, is sandwiched between a lateral surface of the throttle gear 10 and the side surface of the throttle body 3. One end of the return spring 16 is engaged with a cut-out portion of the throttle body 3 while the other end is engaged with a cut-out portion of the throttle gear 10. The return spring 16 is preloaded in the direction of rotation so that the throttle valve 8 remains fully open while the motor 2 is de-energized.

The configuration of an inductive rotational angle detector that serves as a throttle valve position sensor (abbreviated to the TPS) according to an embodiment of the present invention will now be described with reference to FIGS. 3 and 4.

FIG. 3 is a partial cross-sectional view of a rotor 17 that includes an excitation conductor 17A and is a part of the inductive rotational angle detector. FIG. 4 is an exploded perspective view of the rotor 17.

The inductive rotational angle detector includes the excitation conductor 17A, which is mounted on the rotary shaft (throttle shaft 4) of the rotating body (throttle valve 8), and the coils (exciting coil 18A1 and receiver coil 18A2), which are mounted on a stator (the TPS circuit board 18 fastened to the gear cover 20) facing the excitation conductor 17A.

Figure 4:
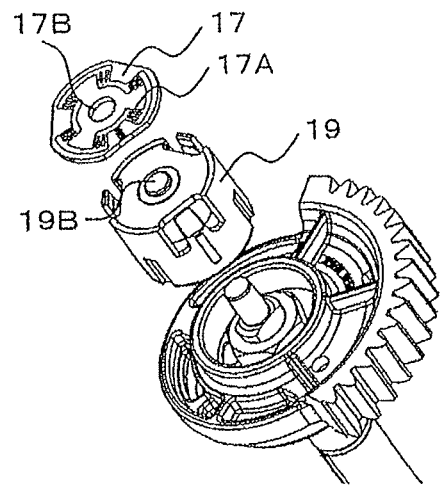
FIG. 4 is an exploded perspective view of the rotating conductor of the inductive rotational angle detector.

As shown in FIGS. 3 and 4, the rotor 17 includes the excitation conductor 17A. The excitation conductor 17A is a nonconductive plate on which radially arranged conductors are printed. The rotor 17 is glued to the upper end of a cup-shaped rotor holder 19 made of plastic molding.

A metallic rotor holder inserter 19A is formed at the center of the rotor holder 19 by integral molding. A through-hole 17B for positioning is formed in the center of the rotor 17. A protrusion 19B, which corresponds to the through-hole 17B, is formed on the rotor holder inserter 19A. This ensures that the central axis of the rotor 17 is in alignment with the central axis of the rotor holder 19. Further, a cylindrical hole 19C is formed on the central axis of the rotor holder inserter 19A. The outer circumference of the leading end of the throttle shaft 4 is press-fit into this hole 19C. Thus, the rotor 19 is fastened to the throttle shaft 4 so that the rotor 17 rotates simultaneously with the throttle shaft 4.

Figure 6:
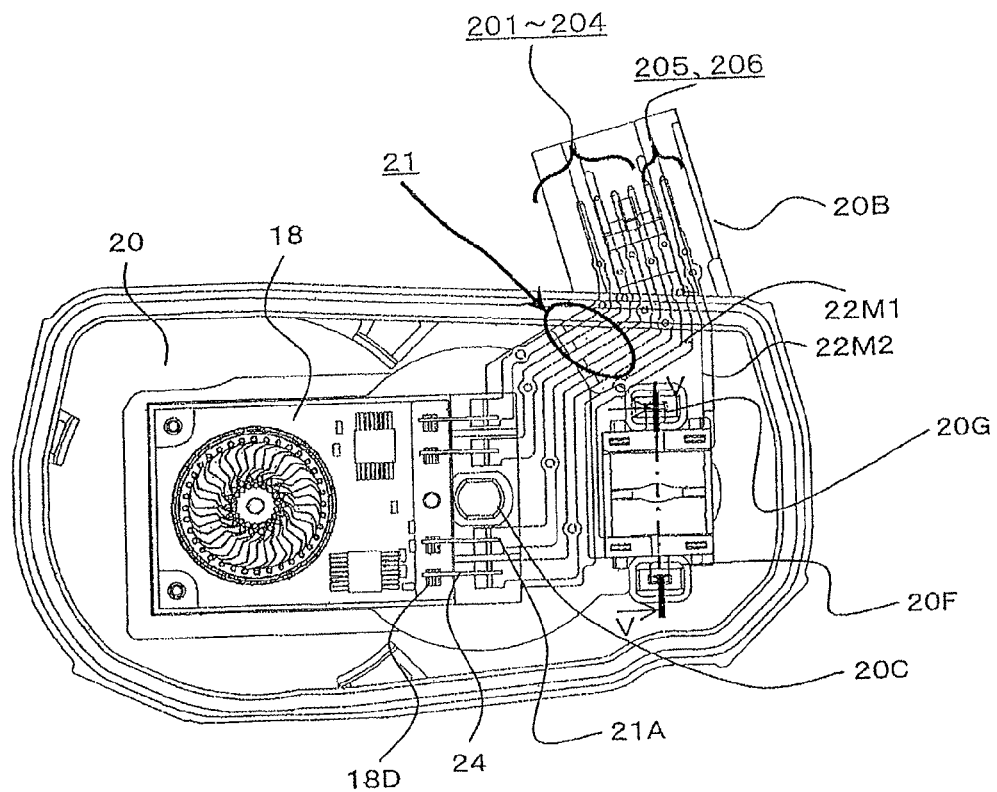
FIG. 6 is a mounting diagram illustrating the TPS circuit board of the inductive rotational angle detector.
Figure 7:
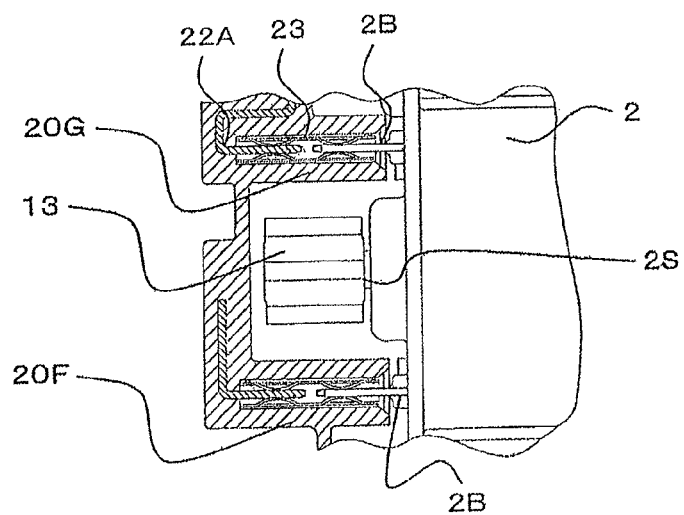
FIG. 7 is a partial cross-sectional view of a motor electrical junction of the motor-driven throttle valve device.

The present embodiment will now be described with reference to FIGS. 5 and 6, and 7.

Figure 5:
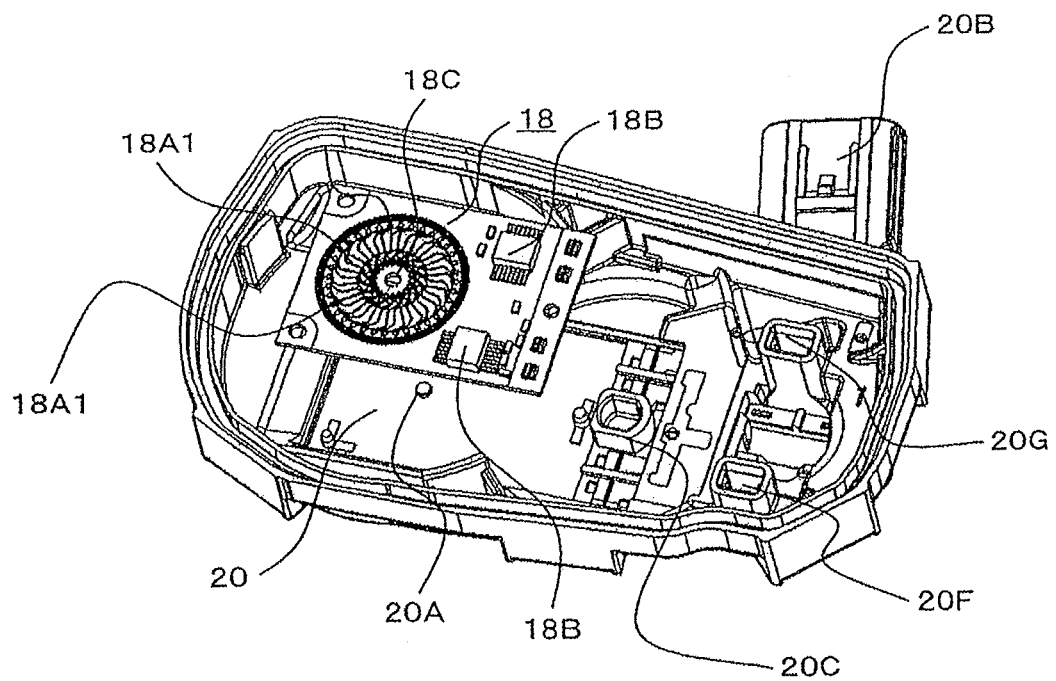
FIG. 5 is an exploded perspective view of a TPS circuit board of the inductive rotational angle detector.

FIG. 5 is an exploded perspective view of the TPS circuit board. FIG. 6 is a mounting diagram illustrating the TPS circuit board. FIG. 7 is a cross-sectional view taken along line V-V of FIG. 6.

The circular exciting coil 18A1 and the radial receiver coil 18A2 are printed on the TPS circuit board 18. These coils face the excitation conductor 17A of the rotor 19 so as to form a detector that detects the rotational position of the throttle shaft 4.

Further, an electronic circuit having two microcomputers is mounted on the TPS circuit board 18. This circuit causes the exciting coil 18A1 to provide excitation control over the excitation conductor 17A, processes a signal received by the receiver coil 18A2, and exercises output control over detected signals.

The TPS circuit board 18 is glued to the gear cover 20 made of plastic molding. In this instance, the TPS circuit board 18 and gear cover 20 are properly positioned by fitting a protrusion 20A formed on the surface of the gear cover 20 into a through-hole 18C formed in the center of the TPS circuit board 18.

Six metallic conductor plates are insert-molded inside the gear cover 20. The conductor plates can be roughly divided into four sensor connection conductor sections 21 and two motor connection conductor sections 22. One end of each of these conductor sections is connected to the connector terminals 201 to 206 for the connector 20B, which is a female connector formed on the gear cover 20 (the connector terminals 201 to 206 may alternatively be formed integrally on one end of each of these conductor sections 21, 22).

When the TPS circuit board 18 is mounted in a vehicle, a plug (male connector) on an end of an electrical wire routed from an engine control unit is connected to the female connector 20B to enable the TPS circuit board 18 to transmit and receive electrical signals.

An end 22A of the motor connection conductor sections 22, which is positioned opposite the connector section, projects from the gear cover 20. As shown in FIG. 7, the end 22A is electrically connected to a conductor 2B on the motor 2 through a junction coupling 23.

An end of the sensor connection conductor sections 21, which is positioned opposite the connector section, is exposed over the surface of the gear cover 20 near the TPS circuit board 18. Electrical conduction is achieved by welding both ends of metal conductors (hereinafter referred to as the lead wires) 24 between the aforementioned exposed end 21A and a welding pad 18D on the TPS circuit board 18.

The highest mounting efficiency is achieved when a boss 20C formed on the gear cover 20 is sandwiched between two sensor connection conductor sections 21 and the remaining two sensor connection conductor sections 21. The boss 20C is used to properly position the gear cover 20 and limit the amount of axial movement of the intermediate gear 15.

The reason for limiting the amount of axial movement of the intermediate gear 15 will now be described with reference to FIG. 1.

A pre-designed gap is provided between the intermediate gear 15 and the boss 20C on the gear cover. If the gap is unduly small, the intermediate gear 15 is sandwiched between the throttle body 3 and the boss 20C on the gear cover due, for instance, to thermal expansion so that the friction against the rotation of the intermediate gear 15 is increased. This gap determines the amount of free axial movement of the intermediate gear 15.

When large-diameter teeth of the intermediate gear 15 mesh with the motor gear 13 and small-diameter teeth of the intermediate gear 15 mesh with the throttle gear 10, it is ideal that the entire widths of the teeth be in mesh. The reason is that increased stress is applied to the roots of the teeth if the entire widths of the teeth are not in mesh. Consequently, the gap is designed to be as small as possible.

If the amount of axial movement of the intermediate gear 15 is unduly large, the intermediate gear 15 may interfere with the TPS circuit board 18 and lead wires 24 on the gear cover 20. For these reasons, the boss 20C is necessary for limiting the amount of axial movement of the intermediate gear 15.

The following describes why the highest mounting efficiency is achieved when the sensor connection conductor sections 21 are placed on both sides of the boss 20C. The achievement of the highest mounting efficiency depends on the fact that conditions enumerated below need be met to form the throttle valve device. The conditions are described below with reference to FIGS. 8 and 9.

Figure 8:
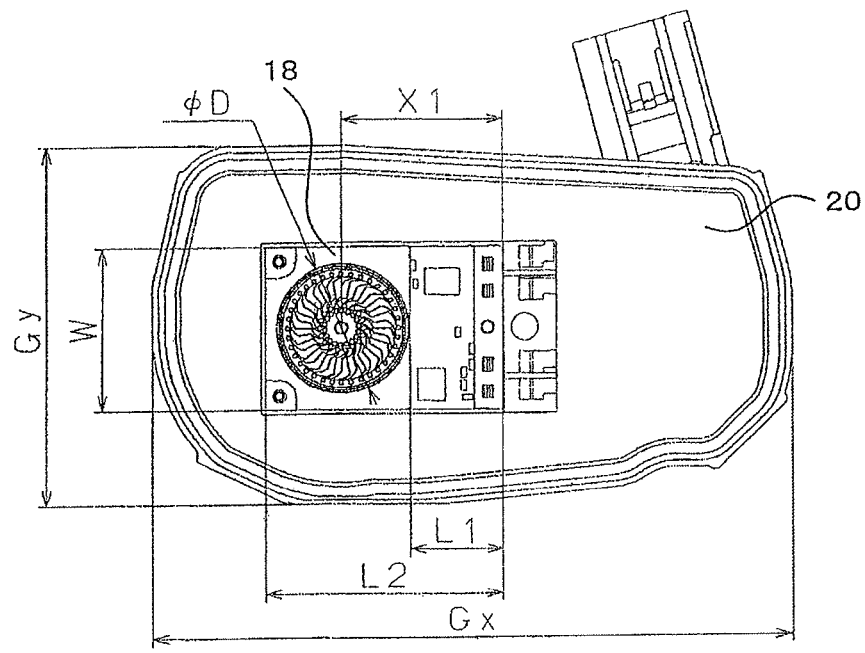
FIG. 8 is a simplified overlay view of the inductive rotational angle detector TPS circuit board and a gear cover.
Figure 9:
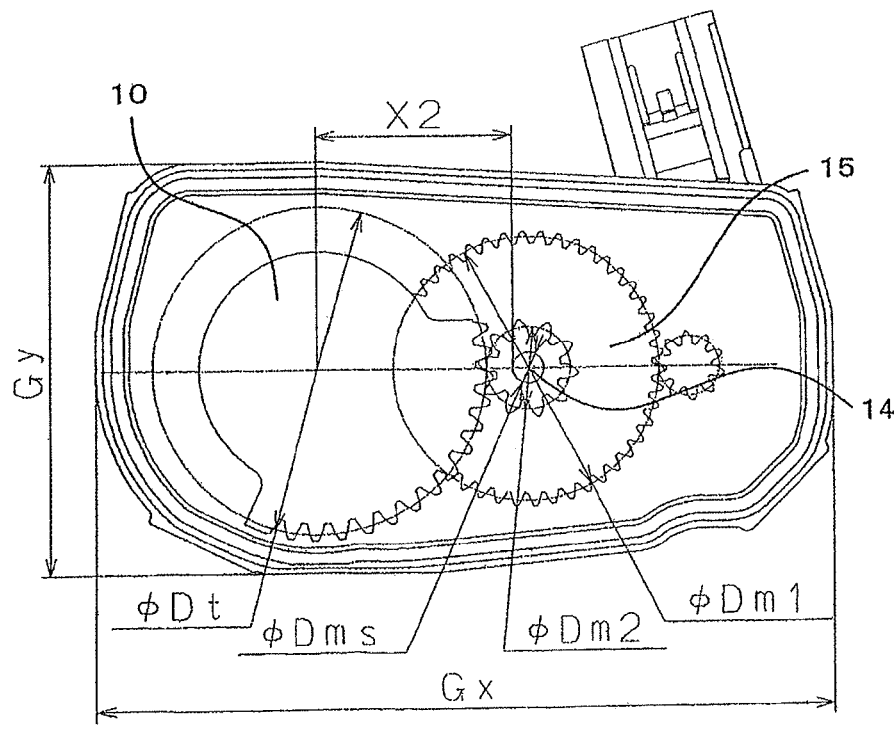
FIG. 9 is a simplified overlay view of the gear cover and gears of the motor-driven throttle valve device.

FIG. 8 is a simplified overlay view of the TPS circuit board and the gear cover. FIG. 9 is a simplified overlay view of gears and the gear cover.

1) The circular exciting coil 18A1 on the TPS circuit board 18 needs to be D or more in diameter. If the exciting coil 18A1 has a small diameter, the accuracy of the rotational angle detector decreases. The diameter of the exciting coil 18A1 automatically determines the dimension W of the short side of the circuit board.

2) An electronic circuit needs to be mounted on the TPS circuit board 18 to provide drive control over a rotational position detector and process relevant output signals. The area required for mounting such an electronic circuit is W×L1. This automatically determines the dimension L2 of the long side of the circuit board.

3) The gear cover 20 needs to include the reduction gear mechanism. To minimize the short side Gy of the gear cover, it is most appropriate that the diameter φDt of the throttle gear 10 be equal to the diameter φDm1 of the intermediate gear 15 with the center of the throttle gear and the center of the intermediate gear placed in a horizontal position.

4) It is necessary that the reduction gear ratio be appropriate. If the reduction gear ratio is unduly low, the motor-generated torque does not build up to a level required for the axis of the throttle shaft. This causes a malfunction. If, on the other hand, the reduction gear ratio is unduly high, the throttle valve decreases its rotation speed, making it difficult to exercise flow rate control at proper timing. It is also necessary that the stress applied to the roots of gear teeth be smaller than a predetermined value to avoid breakage. The stress applied to the roots of gear teeth can be effectively reduced by enlarging the module. However, when an attempt is made to obtain a certain reduction gear ratio in a situation where the module is enlarged, the gear diameter increases. The relationship between the reduction gear ratio and the tooth root stress determines a diameter of a minimum throttle gear: φDt, a large-diameter gear of a minimum intermediate gear φDm1, and a diameter of a small-diameter gear of a minimum intermediate gear: φDm2.

5) It is necessary that the diameter of the intermediate gear shaft 14 be φDms. If the diameter φDms is unduly small, the amount of intermediate gear shaft deformation increases to cause undue abrasion between the intermediate gear shaft and an intermediate gear shaft hole.

Dimensions required to meet the above conditions are described below:

Length of the short side of the TPS circuit board 18: W or more

Length of the long side of the TPS circuit board 18: L2 or more

Diameter of the throttle gear 10: φDt or more

Diameter of the large-diameter gear of the intermediate gear 15: φDm1 or more Diameter of the small-diameter gear of the intermediate gear 15: φDm2 or more Diameter of the intermediate gear shaft 14: φDms or more The following dimensions are determined from the dimensions of the above parts:

Distance X1 between the center of the throttle gear 10 and the end of the long side of the circuit board: (L2−W/2) or more Minimum distance X2 between the center of the throttle gear 10 and the gear shaft 14: ($\phi$Dt+$\phi$Dm2−$\phi$Dms)/2

In a common motor-driven throttle valve device, X1>X2. More specifically, the minimum circuit board dimension, which is calculated from TPS accuracy, is greater than the required minimum distance between the throttle gear 10 and the intermediate gear 15, which is calculated from intensity and reduction gear ratio. Therefore, the best result is obtained when X1=X2, that is, when the distance between gear axes is set up in accordance with the minimum circuit board dimension.

To achieve electrical conduction, it is necessary to weld lead wire 24 to the TPS circuit board 18 and to the sensor connection conductor sections 21 as mentioned earlier. However, it is most appropriate that the boss 20C on the gear cover 20 be sandwiched between two sensor connection conductor sections 21 and the remaining two sensor connection conductor sections 21.

When the above configuration is employed, the TPS circuit board 18 is implemented so as to minimize the effective area (Gx×Gy) of the gear cover 20.

Problems with an opposing implementation method will now be described for the purpose of explaining about the advantages of the above-described structure.

(1) If the possibility of interference between the boss 20C on the gear cover 20 and the lead wires 24 is avoided by moving the position of the boss 20C toward the motor gear 13 as opposed to the present embodiment, it is necessary that X2 be equal to X1+lead wire length. Consequently, the value X2 increases to increase the dimension Gx of the long side of the gear cover.

(2) If the four sensor connection conductor sections 21 are gathered between the boss 20C and one long side of the TPS circuit board 18 as opposed to the present embodiment, the distance between the lead wires decreases. This increases the possibility of the lead wires 24 coming into contact with each other due, for instance, to displacement or collapse of the lead wires 24. If the lead wires come into contact with each other, electrical short-circuiting occurs. As a result, improper TPS output detection occurs. In addition, a welding operation is difficult to perform because the distance between the lead wires is short.

(3) If the welding joints of the lead wires 24 for the TPS circuit board 18 are positioned on both long sides and the remaining short side of the circuit board as opposed to the present embodiment, there is no two-dimensional space between the weld zones of the sensor connection conductor sections 21 and the connector 20B. To achieve the same dimension Gy as in the present embodiment, therefore, it is necessary to bend the sensor connection conductor sections 21 and route them in a three-dimensional manner. As shown in FIG. 3, the TPS circuit board 18 is placed at the outermost position. Thus, the sensor connection conductor sections 21 need to be routed outside the TPS circuit board 18. As a result, the axial dimension of the throttle valve device increases.

(4) If the installation angle of the TPS circuit board 18 is rotated through 90 degrees as opposed to the present embodiment, X1=($\phi$Dt+$\phi$Dm2−$\phi$Dms)/2 as X1=X2 in the present embodiment. As it is obvious that $\phi$Dm2>$\phi$Dms, X1>$\phi$Dt/2. As the dimension Gy of the short side of the gear cover is determined by the dimensions of an internal element plus a necessary gap, the dimensions of the internal element increase because X1>$\phi$Dt/2. As a result, the dimension Gy of the short side of the gear cover increases.

(5) If the installation angle of the TPS circuit board 18 is rotated through 180 degrees as opposed to the present embodiment, the dimensions of the internal element increase for the same reason as in (4) above. As a result, the dimension Gx of the long side of the gear cover increases.

Second Embodiment

A second embodiment of the present invention will now be described with reference to FIG. 10.

Figure 10:
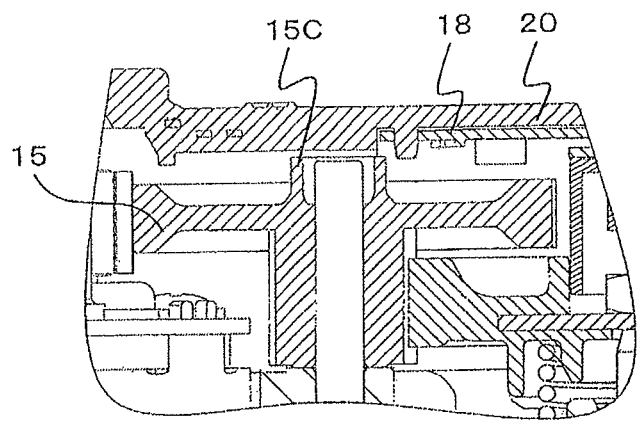
FIG. 10 is a cross-sectional view of a gear section according to a second embodiment of the present invention.

FIG. 10 is a cross-sectional view of an area around the intermediate gear 15.

In the first embodiment, the boss 20C for axial restriction of the intermediate gear 15 is mounted on the gear cover 20. However, the intended purpose can also be achieved by the second embodiment in which a boss 15C is mounted on the intermediate gear 15 as shown in FIG. 10.

Third Embodiment

Figure 12:
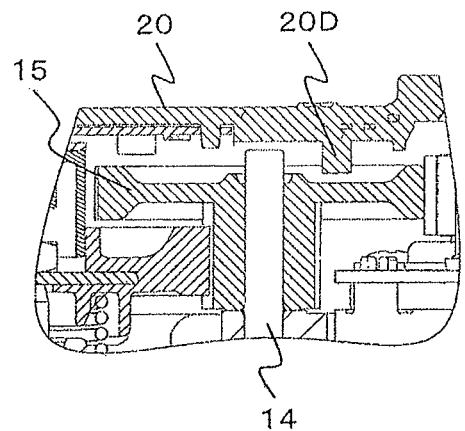
FIG. 12 is a cross-sectional view of the gear section according to the third embodiment taken along line W-W.
Figure 13:
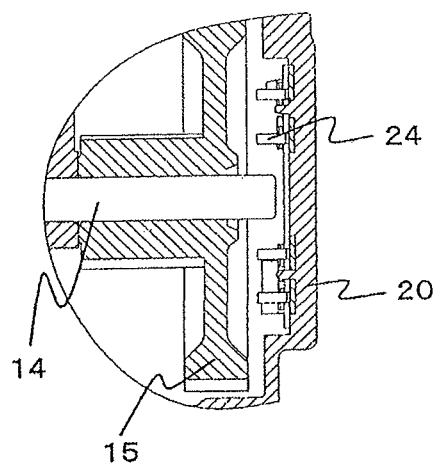
FIG. 13 is a cross-sectional view of the gear section according to the third embodiment taken along line X-X.

A third embodiment of the present invention will now be described with reference to FIGS. 11, 12, and 13.

FIG. 11 is a partial inside view of the gear cover 20. FIG. 12 is a cross-sectional view of the throttle valve device according to the third embodiment taken along line W-W, whereas FIG. 13 is a cross-sectional view taken along line X-X.

In the first embodiment, the boss 20C for axial restriction of the intermediate gear 15 is mounted on the gear cover 20 and on the axis of the intermediate gear shaft 14. However, the intended purpose can also be achieved by the third embodiment, which is configured by positioning a boss 20D toward the motor as shown in FIGS. 11, 12, and 13 instead of mounting it on the axis of the intermediate gear shaft 14, disposing the sensor connection conductor sections 21 in a decentralized manner and away from the boss 20D, and placing the intermediate gear shaft 14 between the lead wires 24.

Fourth Embodiment

A fourth embodiment of the present invention will now be described with reference to FIGS. 14 and 15.

Figure 14:
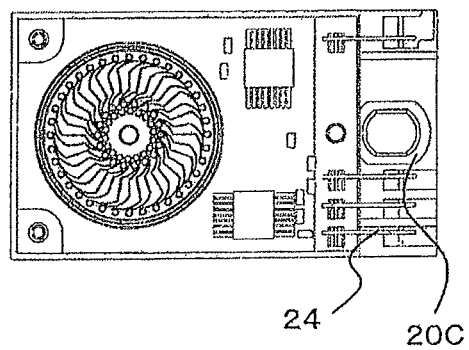
FIG. 14 is an enlarged view of an electrical junction according to a fourth embodiment of the present invention between the inductive rotational angle detector TPS circuit board and sensor connection conductor sections.
Figure 15:
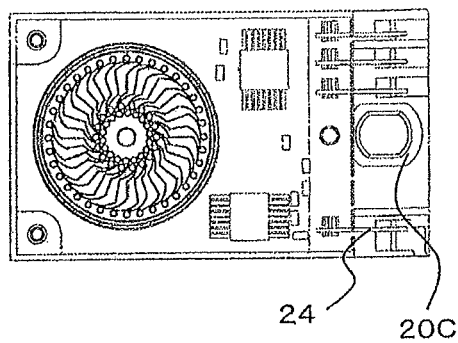
FIG. 15 is an enlarged view of the electrical junction according to the fourth embodiment of the present invention between the inductive rotational angle detector TPS circuit board and the sensor connection conductor sections.

FIGS. 14 and 15 are enlarged views of an electrical junction between the TPS circuit board 18 and the sensor connection conductor sections 21.

In the first embodiment, two of the four sensor connection conductor sections are disposed away from the remaining two. However, the intended purpose can also be achieved by the fourth embodiment, which is configured by disposing one sensor connection conductor section away from the remaining three as shown in FIGS. 14 and 15.

Fifth Embodiment

A fifth embodiment of the present invention will now be described with reference to FIGS. 16 and 17.

Figure 16:
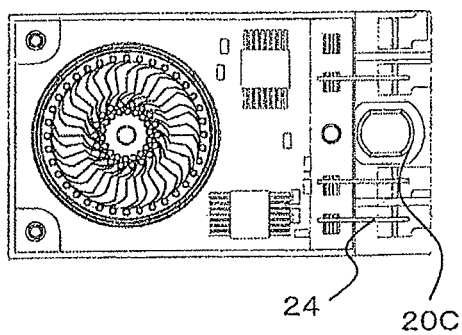
FIG. 16 is an enlarged view of the electrical junction according to a fifth embodiment of the present invention between the inductive rotational angle detector TPS circuit board and the sensor connection conductor sections.
Figure 17:
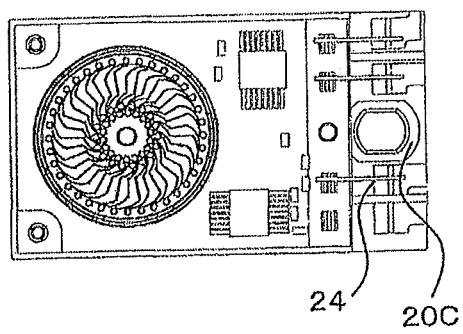
FIG. 17 is an enlarged view of the electrical junction according to the fifth embodiment of the present invention between the inductive rotational angle detector TPS circuit board and the sensor connection conductor sections.

FIGS. 16 and 17 are enlarged views of the electrical junction between the TPS circuit board 18 and the sensor connection conductor sections 21.

In the first and second embodiments, the TPS circuit board 18 having two TPS signal outputs is used. However, the present invention can also be applied to a case where the employed TPS circuit board 18 has one TPS signal output. When the employed TPS circuit board has one TPS signal output, there are three sensor connection conductor sections. Therefore, the sensor connection conductor sections may be disposed in a decentralized manner as shown in FIG. 16 or 17.

Sixth Embodiment

In the first, second, and third embodiments, the electrical junction between TPS circuit board 18 and the sensor connection conductor sections 21 is formed by welding the lead wires 24 to them. However, the present invention can also be applied to a case where the electrical junction is formed, for instance, by wire bonding or soldering.

The above-described embodiments can be summarized as follows.

First Aspect

According to a first aspect of the present invention, there is provided a motor-driven throttle valve device including a rotational angle detector. The rotational angle detector includes a case member, which covers a rotational angle detection target and carries a circuit board; an exciting coil section, which is placed in a circular pattern on the circuit board to generate a magnetic field upon current application; an excitation conductor section, which is fastened to the rotational angle detection target and positioned apart from the exciting coil section to generate a current by electromagnetic action in accordance with the rotational position of the rotational angle detection target; a receiver conductor section, which is mounted on the circuit board to generate a current in accordance with a current flowing in the excitation conductor section; a gear, which is installed between a motor and a throttle valve to reduce the motive power of the motor; and a shaft, which functions as a rotary shaft for the gear. The motor-driven throttle valve device is used with the circuit board electrically connected to a terminal mounted inside the case member. An electrical connection containing a terminal is disposed on one side of the circuit board in a centralized manner, and another electrical connection containing a terminal is disposed in a decentralized manner and positioned away from a protrusion provided for axial restriction of the gear.

Second Aspect

According to a second aspect of the present invention, there is provided the motor-driven throttle valve device as described in the first aspect, wherein an electrical connection containing a terminal is disposed on one side of the circuit board in a centralized manner, and another electrical connection containing a terminal is disposed in a decentralized manner and positioned away from a shaft functioning as a rotary shaft for the gear.

Third Aspect

According to a third aspect of the present invention, there is provided the motor-driven throttle valve device as described in the first aspect, wherein one side of the circuit board is used to achieve electrical conduction in a concentrated manner between a conductor routed inside a gear cover and a different member, and wherein plural electrical conduction spots are disposed in a decentralized manner and positioned away from a protrusion provided to limit the amount of axial movement of the gear.

Fourth Aspect

According to a fourth aspect of the present invention, there is provided the motor-driven throttle valve device as described in the first aspect, wherein the protrusion for limiting the amount of axial movement of the gear is positioned so as not to interfere with an electrical conduction spot, and wherein plural electrical conduction spots are disposed in a decentralized manner and positioned away from a shaft functioning as a rotary shaft for the gear.

The foregoing embodiments are presented to describe a motor-driven throttle valve device that is equipped with an inductive noncontact throttle sensor and used with an internal combustion engine. However, the throttle sensor can also be used to detect the rotation angle of a throttle shaft of a throttle valve device that is driven by a diesel engine or an outboard motor.

In the above instance, a return spring is used to press a throttle valve toward an initial position (a default valve opening position that provides an air amount required for a vehicle's self-propelled travel). Further, another spring (default spring) is provided in addition to the return spring to press the throttle valve from the minimum angular position toward the initial position.

Further, the foregoing embodiments are presented to describe a motor-driven throttle valve device having an aluminum die-cast throttle body. However, the present invention can also be applied to a case where a plastic throttle body is employed. The present invention is also applicable to a case where the employed throttle shaft and throttle valve are made of plastic molding.

What is claimed is:

1. A throttle valve device comprising:
a throttle body which has an intake path;
a motor which is mounted in the throttle body;
an output gear which is fastened to a rotor shaft of the motor;
a throttle shaft which rotates in the intake path;
a final stage gear which is fastened to the throttle shaft;
a rotor which is fastened to the throttle shaft;
an intermediate gear which meshes with the output gear and the final stage gear;
a throttle valve which is fastened to the throttle shaft;
a gear cover which covers the output gear, the final stage gear and the intermediate gear and is made by resin;
a retainer which is positioned on the gear cover to prevent the axial separation of the intermediate gear;
a connector which is mounted on the gear cover;
a plurality of connector terminals mounted on the connector;
a circuit board which is mounted on the gear cover;
a sensor circuit which is mounted on the circuit board and positioned to face the intermediate gear;
a detector that detects the rotational position of the throttle shaft, the detector which is provided on the circuit board and positioned to face the rotor; and
a plurality of sensor connection conductor sections which are disposed along one side of the circuit board to connect the connector terminals to the sensor circuit,
wherein the sensor connection conductor sections are insert-molded into the gear cover and are disposed on both sides of the retainer.

2. The throttle valve device according to claim 1, wherein the motor is connected to the connector terminals through a motor connection conductor section.

3. The throttle valve device according to claim 1,
wherein the circuit board has two sensor circuits, and
wherein the sensor connection conductor sections are connected to the sensor circuits and are disposed in a decentralized manner on both sides of the retainer.

* * * * *